(12) United States Patent
Tadachi et al.

(10) Patent No.: US 10,649,703 B2
(45) Date of Patent: May 12, 2020

(54) PRINT CONTROL APPARATUS, CONTROL METHOD OF A PRINT CONTROL APPARATUS, AND RECORDING MEDIUM

(71) Applicant: SEIKO EPSON CORPORATION, Tokyo (JP)

(72) Inventors: Kazuki Tadachi, Nagano (JP); Takeshi Okamoto, Nagano (JP); Hiromu Okada, Nagano (JP); Hirofumi Miyamoto, Nagano (JP); Kaoru Takemae, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/199,434

(22) Filed: Nov. 26, 2018

(65) Prior Publication Data
US 2019/0163421 A1 May 30, 2019

(30) Foreign Application Priority Data
Nov. 28, 2017 (JP) ................................ 2017-227579

(51) Int. Cl.
*G06F 3/12* (2006.01)
*G06F 21/60* (2013.01)
*G06F 21/31* (2013.01)
*H04N 1/44* (2006.01)
*G06F 21/62* (2013.01)

(52) U.S. Cl.
CPC .......... *G06F 3/1238* (2013.01); *G06F 3/1222* (2013.01); *G06F 21/31* (2013.01); *G06F 21/608* (2013.01); *G06F 21/6245* (2013.01); *H04N 1/4406* (2013.01)

(58) Field of Classification Search
CPC ............................ G06F 3/1238; G06F 21/608
See application file for complete search history.

(56) References Cited

U.S. PATENT DOCUMENTS

| | | | | |
|---|---|---|---|---|
| 2005/0073709 A1* | 4/2005 | Kujirai | ................. | G06F 3/1222 358/1.14 |
| 2005/0168769 A1* | 8/2005 | Kim | ..................... | G06F 21/608 358/1.14 |

(Continued)

FOREIGN PATENT DOCUMENTS

JP 2015-011599 A 1/2015

*Primary Examiner* — Ted W Barnes
(74) *Attorney, Agent, or Firm* — Global IP Counselors, LLP

(57) ABSTRACT

A printing control apparatus suppresses information leaking due to a print job being printed when the user is not at the printer. A printing control apparatus that connects to a terminal and a printer has: a communicator configured to receive from the terminal a specified-printer job, which is a print job for which the printer is designated as a print destination; and a controller. If the specified-printer job is not confidential, the controller sends print data based on the specified-printer job to a specified printer, which is the printer designated as the print destination in the specified-printer job. If the specified-printer job is confidential, the controller receives authentication information input to the printer from the printer and executes an authentication process based on the authentication information, and sends the print data to an authenticated printer according to a result of the authentication process.

8 Claims, 13 Drawing Sheets

(56) References Cited

U.S. PATENT DOCUMENTS

| | | | |
|---|---|---|---|
| 2007/0127053 A1* | 6/2007 | Tominaga | G06F 3/121 358/1.14 |
| 2007/0171467 A1* | 7/2007 | Mokuya | G06F 3/1208 358/1.15 |
| 2008/0052761 A1* | 2/2008 | Minami | G06F 21/608 726/2 |
| 2008/0055627 A1* | 3/2008 | Ellis | G06F 21/608 358/1.14 |
| 2008/0115207 A1* | 5/2008 | Go | G06F 21/608 726/17 |
| 2008/0158597 A1* | 7/2008 | Hashimoto | G06F 21/608 358/1.15 |
| 2008/0259397 A1* | 10/2008 | Uehara | H04N 1/00244 358/1.15 |
| 2009/0002747 A1* | 1/2009 | Ebitani | G06F 21/608 358/1.15 |
| 2009/0174894 A1* | 7/2009 | Kamijo | G06F 21/608 358/1.15 |
| 2009/0268224 A1* | 10/2009 | Takahashi | G06F 21/608 358/1.14 |
| 2011/0063648 A1* | 3/2011 | Moore | G06F 21/608 358/1.13 |
| 2011/0157631 A1* | 6/2011 | Tsutsumi | G06F 3/1205 358/1.15 |
| 2012/0038950 A1* | 2/2012 | Tanaka | G06F 3/1211 358/1.15 |
| 2012/0069386 A1* | 3/2012 | St. Laurent | G06F 3/1204 358/1.15 |
| 2012/0099149 A1* | 4/2012 | Inoue | G06F 3/1204 358/1.15 |
| 2012/0107030 A1* | 5/2012 | Goto | G06F 3/122 400/76 |
| 2012/0148323 A1* | 6/2012 | Shimada | G06F 3/1204 400/76 |
| 2012/0188594 A1* | 7/2012 | Jessen | G06F 3/1219 358/1.15 |
| 2013/0222838 A1* | 8/2013 | Kumar | G06F 3/1222 358/1.14 |
| 2014/0211233 A1* | 7/2014 | Biswal | G06F 3/1238 358/1.14 |
| 2015/0002895 A1* | 1/2015 | Nakatsuka | G06F 3/1285 358/1.15 |
| 2015/0199161 A1* | 7/2015 | Gutnik | G06F 3/1296 358/1.15 |
| 2015/0278669 A1* | 10/2015 | Akiyama | G06K 15/4095 358/1.14 |
| 2016/0077778 A1* | 3/2016 | Aritomi | G06F 21/35 358/1.15 |
| 2017/0019566 A1* | 1/2017 | Nithianand | G06F 3/1285 |
| 2017/0160996 A1* | 6/2017 | Ohba | G06F 3/1238 |
| 2018/0278780 A1* | 9/2018 | Bhaskaran | G06F 3/1222 |
| 2018/0373477 A1* | 12/2018 | Ozawa | G06F 3/1238 |

* cited by examiner

PRINT CONTROL APPARATUS, CONTROL METHOD OF A PRINT CONTROL APPARATUS, AND RECORDING MEDIUM

BACKGROUND

1. Technical Field

The present invention relates to a print control apparatus to connects to a terminal and a printing device, to a control method of a print control apparatus, and a recording medium.

2. Related Art

JP-A-2015-011599 describes a print control apparatus (print server) that connects to a terminal and a printing device, and sends print data that is received from the terminal and is based on a print job for which a printing device is specified as the print destination to the printing device specified as the print destination regardless of requests from the printing device. Note that the print server in parentheses in this paragraph is the name used in JP-A-2015-011599.

With this print control apparatus, however, a print job is printed even when the user is not at the printer. As a result, if the print job contains confidential information, the confidential information will be printed and possibly leaked.

SUMMARY

An object of the present invention is to provide a print control apparatus, a control method of a print control apparatus, and a recording medium for suppressing information leakage due to a print job being printed when the user is not waiting at the printer.

A printing control apparatus according to the invention connects to a terminal and a printer, and has: a communicator configured to receive from the terminal a specified-printer job, which is a print job for which the printer is designated as a print destination; and a controller configured to process the print job. The controller determines whether or not the specified-printer job is confidential. If the specified-printer job is not confidential, the controller sends print data based on the specified-printer job to a specified printer, which is the printer designated as the print destination in the specified-printer job. If the specified-printer job is confidential, the controller receives authentication information input to the printer from the printer and executes an authentication process based on the authentication information, and sends the print data to an authenticated printer, which is the printer that sent the authentication information, according to a result of the authentication process.

When a specified-printer job is confidential, this aspect of the invention prints the specified-printer by an authenticated printer. As a result, confidential specified-printer jobs are printed when the user is at the authenticated printer. Information leaking because a print job is printed when the user is not at the printer can therefore be suppressed.

Preferably in a printing control apparatus according to another aspect of the invention, the specified-printer job contains user information; and the controller, for a specified-printer job with user information corresponding to the input authentication information, sends the print data based on the specified-printer job to the authenticated printer.

This configuration enables sending print data based on a specified-printer job containing user information corresponding to the input authentication information to an authenticated printer.

Preferably in another aspect of the invention, the controller determines the specified-printer job is confidential when a specific string is included in a document of the specified-printer job, and determines the specified-printer job is not confidential when the specific string is not included in a document of the specified-printer job.

By determining whether or not a specific string is contained in a document of a specified-printer job, this configuration can determine whether or not the specified-printer job is confidential.

Preferably in another aspect of the invention, the controller determines whether or not the specified-printer job is a same-printer job designating the same printer as the authenticated printer as the print destination. If the specified-printer job is not a same-printer job, the controller displays the specified-printer job as a printing candidate on the authenticated printer, and if the displayed specified-printer job is selected for printing, sends the print data based on the specified-printer job to the authenticated printer. If the specified-printer job is a same-printer job, the controller sends the print data based on the same-printer job to the authenticated printer without displaying the specified-printer job as a printing candidate on the authenticated printer.

When an authentication operation is executed on the same printer as the specified printer, this configuration prints the same-printer job on the authenticated printer without the specified-printer job being displayed on the authenticated printer. As a result, the user, by executing the authentication operation on the same printer as the specified printer, can print the specified-printer job on the authenticated printer without needing to select the specified-printer job for printing.

Preferably in another aspect of the invention, the controller, when the specified-printer job is confidential, displays on the terminal that sent the specified-printer job a printing process selection screen enabling selecting from among multiple selection candidates a first selection candidate causing printing the specified-printer job on the specified printer, and a second selection candidate causing printing the specified-printer job on the authenticated printer; sends the print data based on the specified-printer job to the specified printer when the first selection candidate is selected from the printing process selection screen; and sends the print data based on the specified-printer job to the authenticated printer when the second selection candidate is selected from the printing process selection screen.

When a specified-printer job is confidential, this configuration causes the user to select whether to print the specified-printer job on the specified printer or an authenticated printer. As a result, by selecting the first selection candidate, the user cause the specified printer to print the specified-printer job without executing the authentication operation on that printer even when the specified-printer job is confidential.

Preferably in another aspect of the invention, the controller, when the first selection candidate is selected from the printing process selection screen, queries the specified printer for status information, and if the status information indicates a logged-in state, does not send the print data based on the specified-printer job to the specified printer.

This configuration suppresses printing a specified-printer job by a specified printer to which a user has logged in. As a result, if someone else is logged in to the specified printer, and the user mistakenly selects the first selection candidate, confidential information leaking to that other person can be suppressed.

Preferably in another aspect of the invention, the controller, when the specified-printer job is confidential, displays, on the terminal that sent the specified-printer job, an authentication prompt prompting the user to execute an authentication operation for the printer.

When a specified-printer job is confidential, this configuration can prompt the user to execute the authentication operation on the printer.

A control method of a printing control apparatus according to another aspect of the invention is a control method of a printing control apparatus that connects to a terminal and a printer, the control method causing the printing control apparatus to execute steps of: receiving from the terminal a specified-printer job, which is a print job for which the printer is designated as a print destination; determining whether or not the specified-printer job is confidential; if the specified-printer job is determined not confidential, sending print data based on the specified-printer job to a specified printer, which is the printer designated as the print destination in the specified-printer job; and if the specified-printer job is determined confidential, receiving authentication information input to the printer from the printer and executing an authentication process based on the authentication information, and sending the print data to an authenticated printer, which is the printer that sent the authentication information, according to a result of the authentication process.

Another aspect of the invention is a program causing a processor of a printing control apparatus that connects to a terminal to execute steps of: receiving from the terminal a specified-printer job, which is a print job for which the printer is designated as a print destination; determining whether or not the specified-printer job is confidential; if the specified-printer job is determined not confidential, sending print data based on the specified-printer job to a specified printer, which is the printer designated as the print destination in the specified-printer job; and if the specified-printer job is determined confidential, receiving authentication information input to the printer from the printer and executing an authentication process based on the authentication information, and sending the print data to an authenticated printer, which is the printer that sent the authentication information, according to a result of the authentication process.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of a print control device, control method of a print control device, and a program according to the invention are described below with reference to the accompanying figures.

Figure 1:
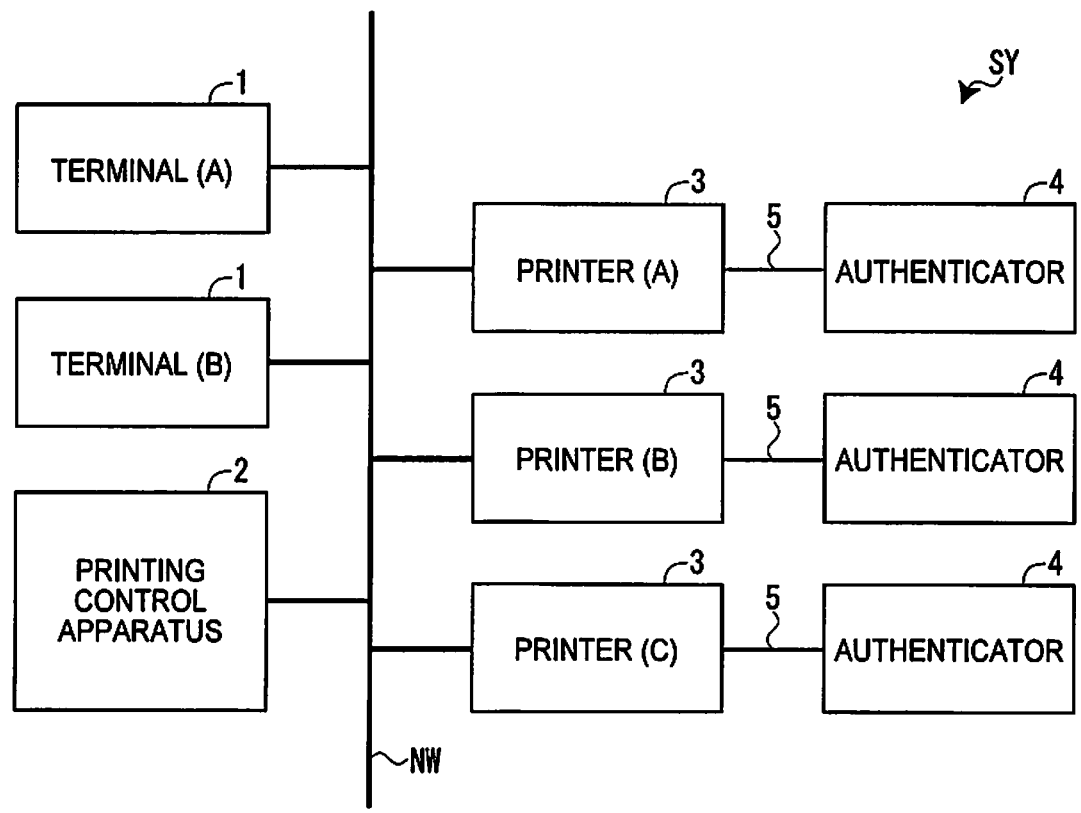
FIG. 1 is a block diagram illustrating the configuration of a printing system according to the first embodiment of the invention.

FIG. 1 illustrates the configuration of a printing system SY according to an embodiment of the invention. The printing system SY includes terminals 1, a printing control apparatus 2, printers 3, and authenticators 4 equal in number to the number of printers 3. The printing system SY according to this embodiment has two terminals, (A) and (B) as the terminals 1, but the number of terminals 1 is not specifically limited. Likewise, this printing system SY includes three printers 3, printer (A), printer (B), and printer (C), but the number of printers 3 is not specifically limited.

The terminals 1, printing control apparatus 2, and printers 3 connect through a network NW. The network NW may be a LAN (local area network), or a wide area network such as the Internet. The network NW is also not limited to a single network, and may comprise a combination of multiple different networks. For example, the terminals 1 and printing control apparatus 2 may connect through a first network, and the printing control apparatus 2 and printers 3 may connect through a second network. The mode of communication through the network NW may be wireless or by wire.

Each printer 3 connects to a authenticator 4 through a cable 5. The printers 3 and authenticators 4 may also be connected wirelessly. The printers 3 and authenticators 4 do not need to be continuously connected, and may connect when necessary (such as only when the user performs an authentication operation).

A terminal 1 generates a print job, and sends a print command to the printing control apparatus 2. The terminal 1 may be a personal computer (PC), or an information processing device such as a smartphone or tablet computer.

The printing control apparatus 2 sends print data based on a print job sent from a terminal 1 to a printer 3. The printing control apparatus 2 may be a server device, or a PC, tablet computer, or other information processing device instead of a server device. The printing control apparatus 2 executes a language conversion process converting the print job to a language the printer 3 can understand, and sends the language-converted print job as print data. If the printer 3 can interpret the print job without conversion, the printing control apparatus 2 may omit the language conversion process. The printing control apparatus 2 may also generate print data by applying an editing process to the print job (such as adding specific information or image processing).

Based on the print data sent from the printing control apparatus 2, the printer 3 prints the print job. The printer 3 also receives an authentication operation by the user, and sends authentication information (such as the user ID or password) input to the authenticator 4 or the operating panel 37 of the printer 3 to the printing control apparatus 2. Note that the printer 3 may be a multifunction device having in addition to a printing function a photocopier function, scanner function, fax function, or other functions.

An authenticator 4 is disposed to a corresponding printer 3, and reads authentication information from an authentication medium based on an authentication operation the user performs using an authentication medium (such as an IC card) storing authentication information. The authenticator 4 sends the read authentication information to the printer 3.

Note that the authenticator 4 is not limited to a configuration for reading authentication information from an authentication medium, and may be configured to prompt the user to input authentication information. The printer 3 may also have a built-in authentication function, in which case the authenticator 4 is included in the printer 3 itself. The authenticator 4 may also be configured to collect biometric information such as a facial or iris scan of the user as the authentication information.

Figure 2:
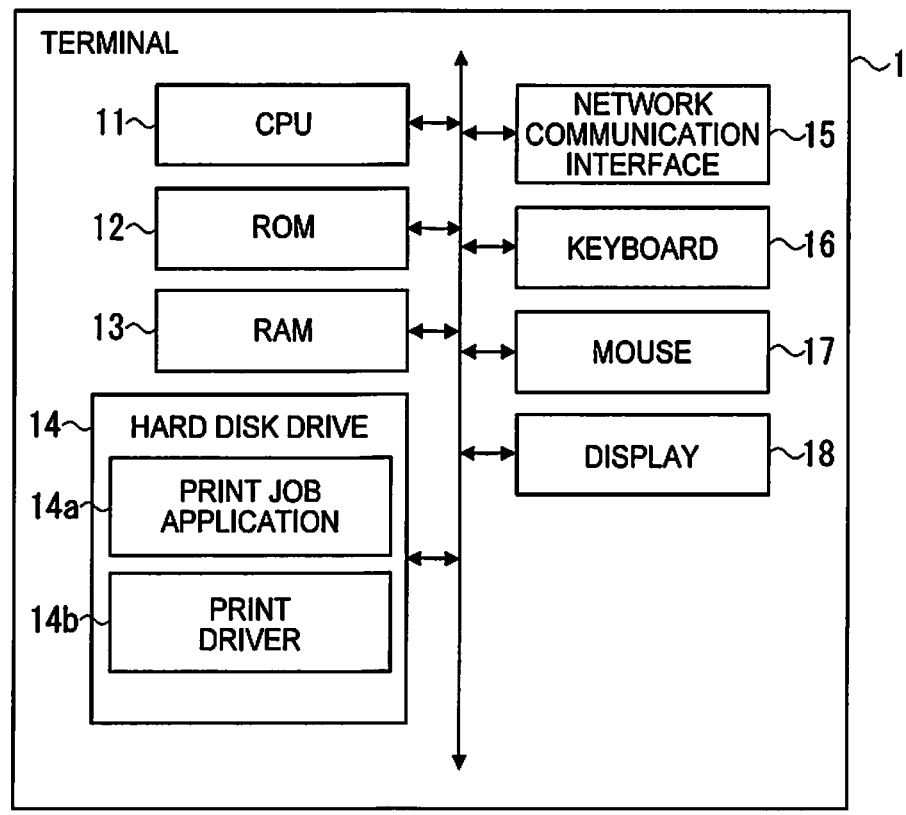
FIG. 2 is a block diagram illustrating the hardware configuration of a terminal.

The hardware configurations of devices in the printing system SY are described below with reference to FIG. 2 to FIG. 5. FIG. 2 is a block diagram illustrating the hardware configuration of a terminal 1.

A terminal 1 includes a CPU 11 (Central Processing Unit), ROM 12 (Read Only Memory), RAM 13 (Random Access Memory), hard disk drive 14 (Hard Disc Drive), network communication interface 15, keyboard 16, mouse 17 and display 18.

The CPU 11 controls signal input/output between parts of the terminal 1, and processes operations. ROM 12 is a nonvolatile storage medium, and stores programs such as a BIOS (Basic Input Output System). RAM 13 is a volatile storage medium, and is used by the CPU 11 as a work area.

The hard disk drive 14 is a nonvolatile auxiliary storage medium, and in addition an OS (Operating System), stores a print job application 14a and print driver 14b. The print job application 14a is used to generate print jobs. Word processing applications, image editing applications, web browsers and other programs can be used as the print job application 14a. The print driver 14b controls a printer 3.

The network communication interface 15 communicates through the network NW with the printing control apparatus 2. The keyboard 16 and mouse 17 are used as operating means enabling the user to select a printer 3 as the print destination and perform other operations. The display 18 is used as a display means for displaying information such as a printer selection screen D1 (see FIG. 6).

Figure 3:
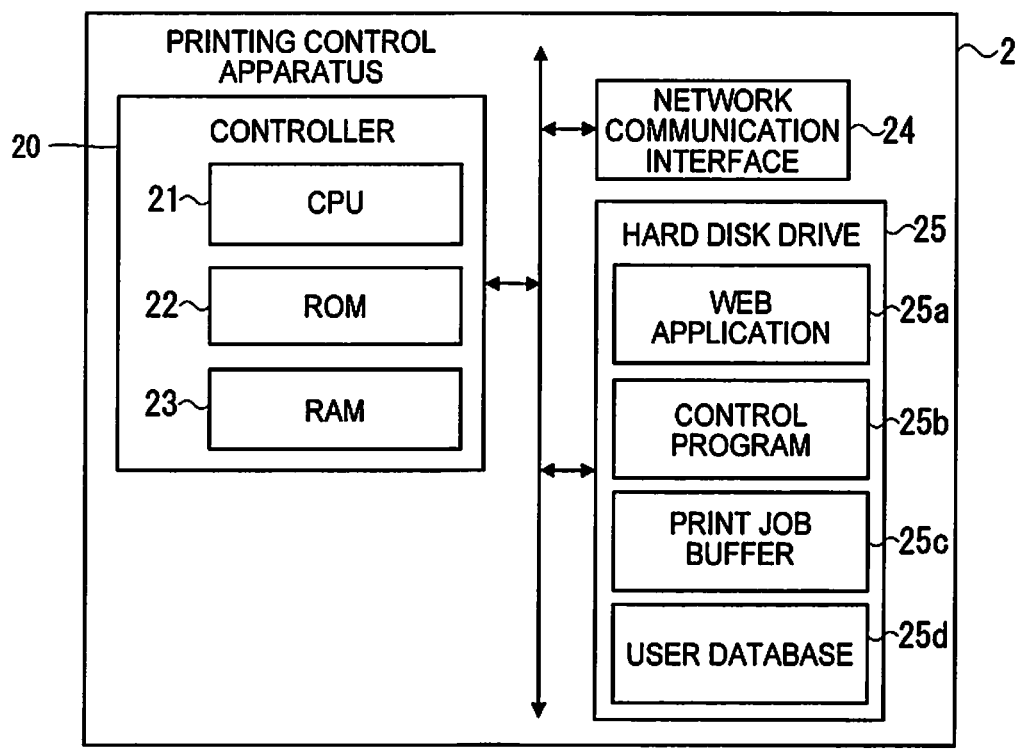
FIG. 3 is a block diagram illustrating the hardware configuration of a print control device.

FIG. 3 is a block diagram illustrating the hardware configuration of the printing control apparatus 2. The printing control apparatus 2 includes a 20, network communication interface 24, and hard disk drive 25.

The controller 20 executes the print control process described below. The controller 20 includes a CPU 21, ROM 22, and RAM 23.

The CPU 11 controls signal input/output between parts of the printing control apparatus 2, and processes operations. Note that the CPU 21 is an example of a processor in the accompanying claims. The processor may be configured with one or more CPUs, an ASIC (Application Specific Integrated Circuit) or other hardware circuits, or by the cooperation of such devices. ROM 22 stores programs such as a BIOS. RAM 23 is used by the CPU 21 as a work area. The network communication interface 24 communicates through the network NW with a terminal 1 and printer 3. For example, the network communication interface 24 receives a print job from a terminal 1. The network communication interface 24 is an example of a communicator in the accompanying claims.

The hard disk drive 25 is a nonvolatile auxiliary storage medium, and in addition an OS, stores a web application 25a and control program 25b, and has a print job buffer 25c and user database 25d [sic, 24d]. The web application 25a is used to provide web pages such as the print job list D2 (see FIG. 9) to the printer 3. The control program 25b is used to execute the print control process based on a print job received from the terminal 1.

Of the print jobs received from the terminal 1, a specific print job is stored in the print job buffer 25c as described further below. Note that if the printing control apparatus 2 receives a notice of printing completion from the printer 3 after sending print data based on a print job to the printer 3, the printing control apparatus 2 deletes that print job from the print job buffer 25c. The printing control apparatus 2 may also delete a print job stored in the print job buffer 25c after a specific time has past from when holding the print job started, or based on a delete command from the terminal 1. Authorized user information indicating users with access privileges for the printer 3 are registered in the 24d.

Figure 4:
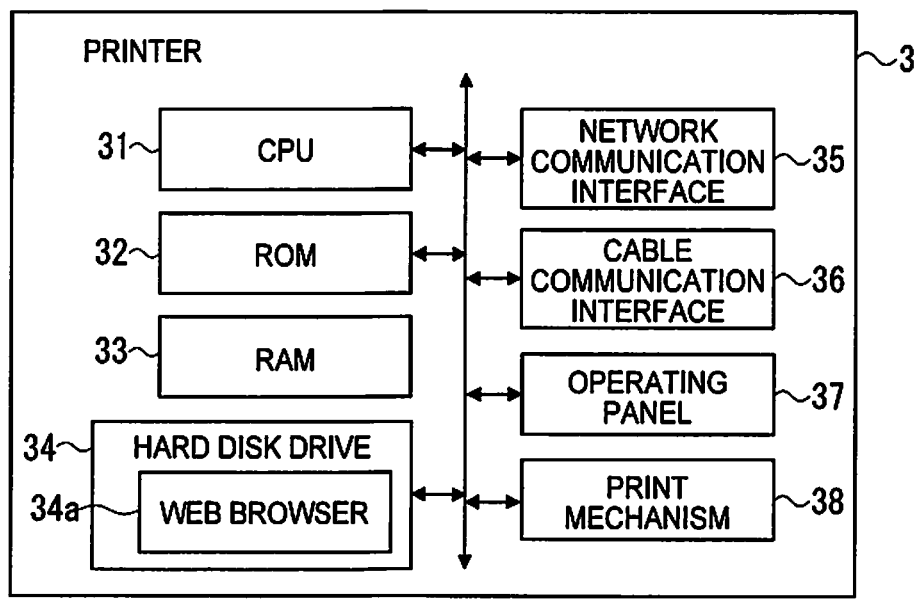
FIG. 4 is a block diagram illustrating the hardware configuration of a printing device.

FIG. 4 is a block diagram illustrating the hardware configuration of the printer 3. The printer 3 includes a CPU 31, ROM 32, RAM 33, hard disk drive 34, network communication interface 35, cable communication interface 36, cable communication interface 36, operating panel 37, and print mechanism 38 print mechanism 38.

The CPU 31 controls signal input/output between parts of the printer 3, and processes operations. ROM 33 stores printer 3 firmware. RAM 33 is used by the CPU 31 as a work area. The hard disk drive 34 stores a web browser 34a, for example. The web browser 34a is used to display web pages such as a print job list D2.

The network communication interface 35 communicates through the network NW with the printing control apparatus 2. The cable communication interface 36 communicates through a cable 5 with an authenticator 4. The operating panel 37 is used as a display means for displaying information such as the print job list D2, and an operating means for operations such as making a selection from the print job list D2. The print mechanism 38 prints on copy paper or other print medium by an inkjet or electrophotographic printing method.

Figure 5:
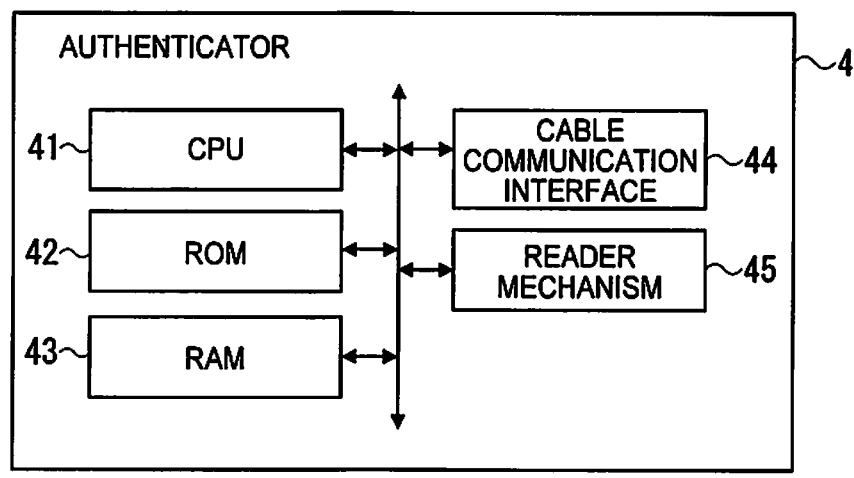
FIG. 5 is a block diagram illustrating the hardware configuration of an authenticator.

FIG. 5 is a block diagram illustrating the hardware configuration of the authenticator 4. The authenticator 4 includes a CPU 41, ROM 42, RAM 43, cable communication interface 44 and reader mechanism 45.

The CPU 41 controls signal input/output between parts of the authenticator 4, and processes operations. ROM 44 stores authenticator 4 firmware. RAM 44 is used by the CPU 41 as a work area. The cable communication interface 44 communicates through a cable 5 with the printer 3. Based on a user authentication operation, the reader mechanism 45 reads authentication information from an authentication medium. Depending on the type of authentication medium, the reader mechanism 45 may be an IC card reader, a magnetic card reader, or a two-dimensional code reader, for example.

Figure 6:
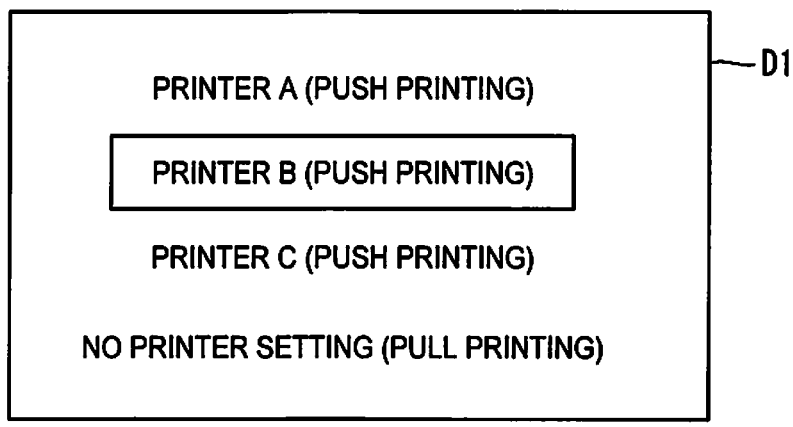
FIG. 6 shows an example of a printer selection screen.

The printer selection screen D1 is described with reference to FIG. 6. The printer selection screen D1 is displayed on the terminal 1 when the user issues a print command to the printing control apparatus 2 through the terminal 1. Printer A (push printing), Printer B (push printing), Printer C (push printing) and No Printer Setting (pull printing) are displayed as selection candidates in the printer selection screen D1.

Of the selection candidates displayed in the printer selection screen D1, Printer A (push printing), Printer B (push printing) and Printer C (push printing) respectively specify printer (A), printer (B), and printer (C) as the print destination. Of the selection candidates displayed in the printer selection screen D1, No Printer Setting (pull printing) is used when a specific printer 3 is not selected as the print destination.

Using the printer selection screen D1, the user can thus select a printing method designating a specific printer 3 as the print destination (referred to below as push printing), or a printing method not designating a specific printer 3 as the print destination (referred to below as pull printing).

Figure 7:
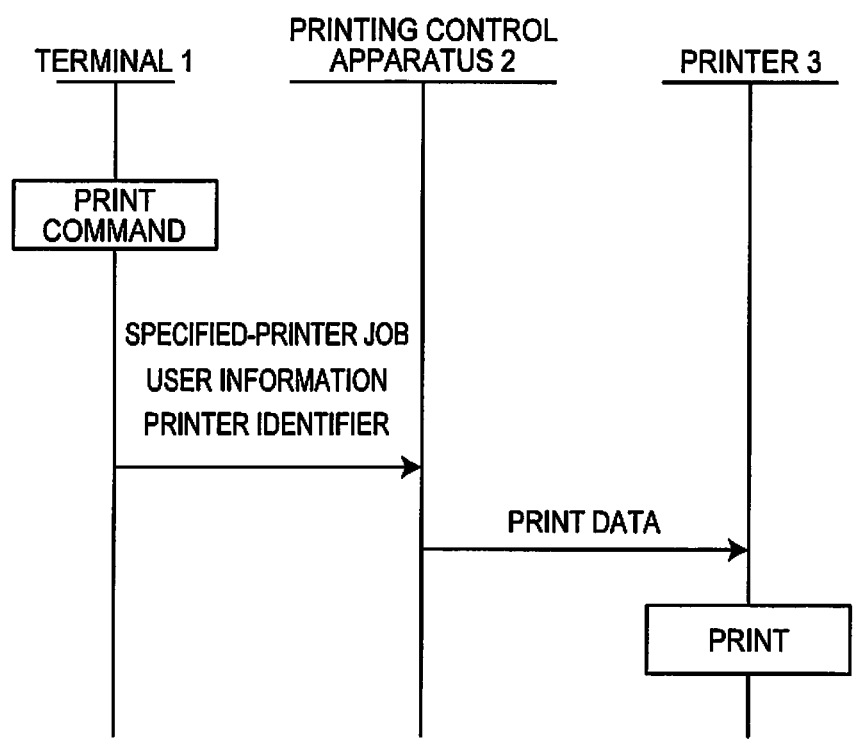
FIG. 7 is a flow chart of a push printing process.

The flow of push printing is described below based on FIG. 7. If the user asserts a print command after first selecting Printer A (push printing), Printer B (push printing) or Printer C (push printing) from printer selection screen D1, the terminal 1 sends a print job with a specific printer 3 designated as the print destination (referred to below as a specified-printer job) to the printing control apparatus 2.

User information and a printer identifier are added to the transmitted specified-printer job. The user information is for identifying the user that issued the print command. Information the user previously registered in the print driver 14b, or login information used by the user to log in to the terminal 1, for example, may be used as the user information. The printer identifier is for identifying the printer 3 selected as the print destination. For example, when Printer A (push printing) is selected in the printer selection screen D1, the printer identifier identifying Printer (A) as the print destination is added as the print destination to the specified-printer job that is sent.

When a specified-printer job is received from the terminal 1, the printing control apparatus 2, in principle, sends, without requiring a command from the printer 3, print data based on the specified-printer job to the printer 3 designated as the print destination in the specified-printer job (referred to below as the specified printer 3a). More specifically, the printing control apparatus 2 references the printer identifier added to the specified-printer job, and sends print data based on the specified-printer job to the printer 3 (specified printer 3a) the printer identifier identifies as the print destination. As a result, the specified-printer job is printed by the specified printer 3a.

Figure 8:
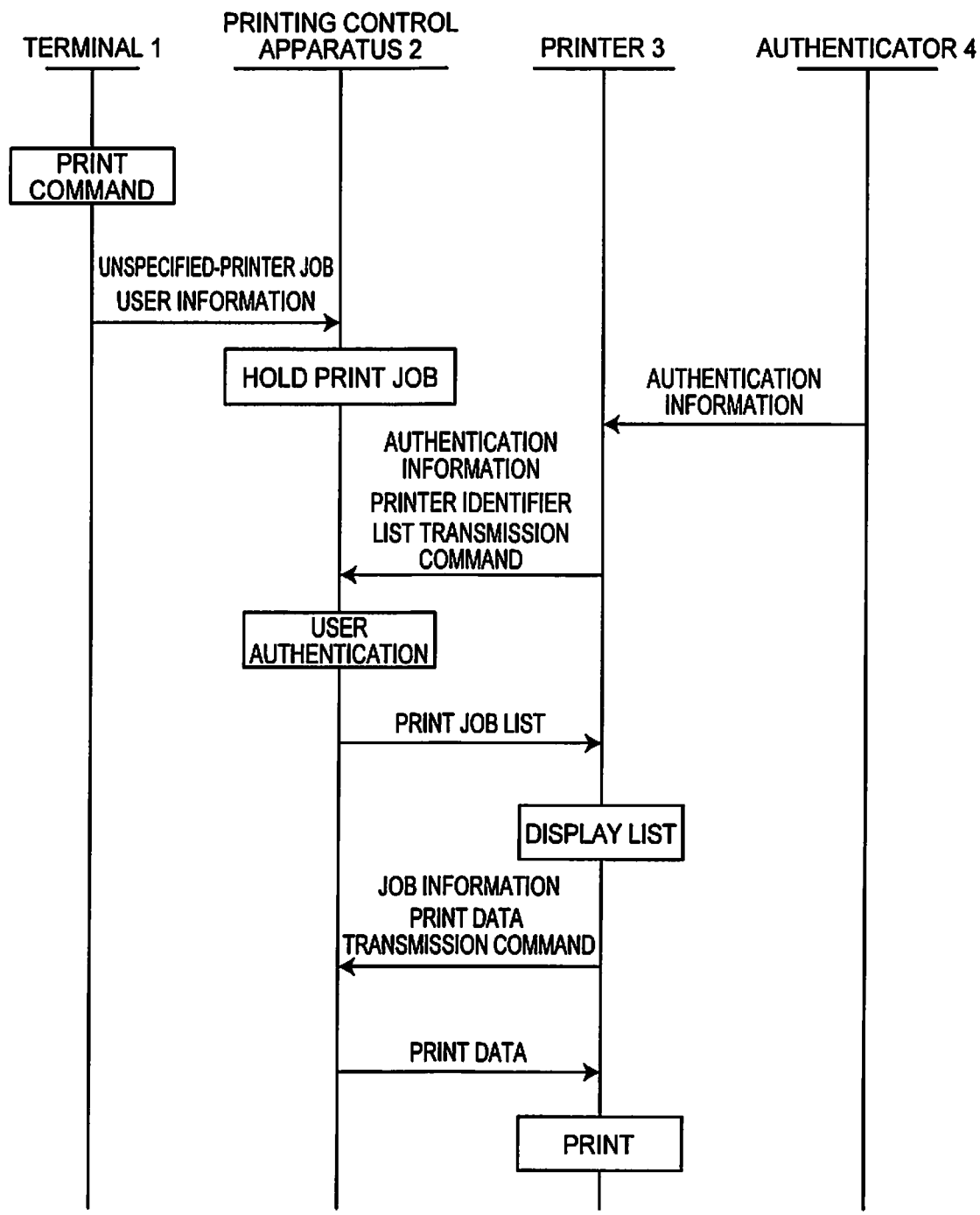
FIG. 8 is a flow chart of a pull printing process.

The process of pull printing is described next based on FIG. 8. If the user asserts a print command after first No Printer Setting (pull printing) from printer selection screen D1, the terminal 1 sends a print job without a specific printer 3 designated as the print destination (referred to below as an unspecified-printer job) to the printing control apparatus 2. In this event, user information is added to the unspecified-printer job that is sent, but a printer identifier is not added.

The printing control apparatus 2 then stores the unspecified-printer job received from the terminal 1 relationally to the user information added to the unspecified-printer job in the print job buffer 25c. Note that as described below, certain specified-printer jobs may be stored in the print job buffer 25c in addition to unspecified-printer jobs.

After asserting a print command for an unspecified-printer job from the terminal 1, the user goes from the location of the terminal 1 to the location of the desired printer 3, and executes an authentication operation on the authenticator 4 connected to that printer 3. The authenticator 4 reads the authentication information based on the authentication operation, and sends the read authentication information to the connected printer 3.

When authentication information is received from the authenticator 4, the printer 3 sends the acquired authentication information, printer identifier, and print job list D2 transmission request to the printing control apparatus 2. The print job list D2 transmission request may be transmitted after the user authentication described below is successful.

Based on the authentication information received from the printer 3, the printing control apparatus 2 executes a user authentication process, that is, a process determining if the user that executed the authentication operation is a registered user with printing rights (authorized to print). More specifically, the printing control apparatus 2 compares the authentication information input to the authenticator 4 with authorized user information registered in the user database 25d [sic, 24d] of the printing control apparatus 2, or on an external server (such as a LDAP server), and if authentication is OK, enables using the printer 3 (that is, logs in the user). Note that the printing control apparatus 2 may handle user authentication by comparing the authentication information input to the authenticator 4 with the user information added to the print job.

If user authentication is successful, that is, the user that executed the authentication operation is confirmed to be a registered user with printing rights, the printing control apparatus 2 generates a print job list D2 (see FIG. 9) based on the print job list D2 transmission request. The print job list D2 includes one or more job names 51. A job name 51 is the name of a specific print job (such as the file name). The printing control apparatus 2 generates the print job list D2 containing the print jobs stored in the print job buffer 25c that are related to the user information matching the authentication information. For example, if user A executes the authentication operation on the authenticator 4 and authentication information for user A is acquired, the print job list D2 includes the job names 51 of the print jobs stored in the printing control apparatus 2 that are also related to the user information for user A, that is, print jobs for which user A issued a print command.

The printing control apparatus 2 provides the resulting print job list D2 to the printer 3 that sent the print job list D2 transmission request, that is, to the printer 3 for which the user executed the authentication operation on the authenticator 4. The print job list D2 is provided to the printer 3 as a web page, for example.

Figure 9:
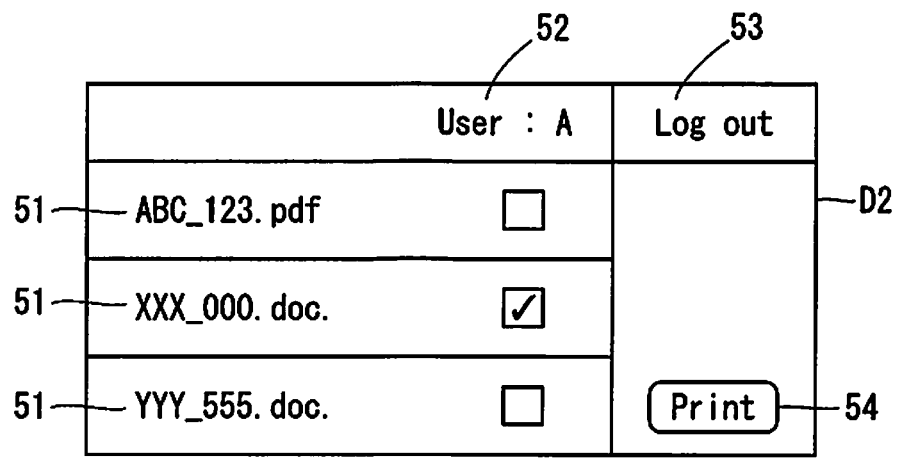
FIG. 9 shows an example of a print job list.

The printer 3 then displays the provided print job list D2. As shown in FIG. 9, in addition to displaying one or more job names 51, the user name 52, a logout button 53, and a Print button 54 are also presented in the print job list D2. The user name 52 is displayed based on the authentication information acquired from the authenticator 4. The logout button 53 is used to log out after the user completes the desired operation on the printer 3 to which the user logged in after user authentication. The printer 3 also logs out automatically if the logout button 53 is not operated and a user operation is not received for a specific time after the user logs in.

When the job name 51 of the unspecified-printer job desired by the user is selected from the job names 51 displayed in the print job list D2, and the Print button 54 is operated, the printer 3 sends the job information identifying the selected job name 51 with a print data transmission request to the printing control apparatus 2.

Based on the unspecified-printer job corresponding to the received job information, the printing control apparatus 2 generates print data in a format compatible with the printer 3 of the print destination, and sends the print data to the printer 3 of the print destination. As described above, the printer 3 of the print destination is the printer 3 that sent the print data transmission request, that is, the printer 3 for which the user executed the authentication operation. As a result, the unspecified-printer job is printed by that printer 3.

Note that as described above the job names 51 included in the print job list D2 are the job names 51 of the print jobs stored in the print job buffer 25c that are related to the user information corresponding to the authentication information. As a result, of the stored print jobs, print data based on a print job related to the user information of the user that executed the authentication operation is sent to the printer 3 for which the authentication operation was executed. In other words, a stored print job is sent to the printer 3 that sent authentication information based on the result of user authentication (referred to below as the authenticated printer 3b).

As described above, when push printing is selected in the printer selection screen D1, the printing control apparatus 2 according to this embodiment causes the specified printer 3a to print the specified-printer job. When pull printing is selected in the printer selection screen D1, the printing control apparatus 2 causes the authenticated printer 3b to print the unspecified-printer job.

When push printing is selected and the terminal 1 and the specified printer 3a are in different locations, the print job will be printed without the user being at the specified printer 3a. As a result, if the print job contains confidential information, the printout containing the confidential information could be taken by another person and the printed confidential information possibly stolen.

As a result, by executing the print control process described below when the print job is confidential even if push printing is selected by the user, the printing control apparatus 2 according to this embodiment causes an authenticated printer 3b to print the print job instead of the specified printer 3a.

The print control process executed by the controller 20 of the printing control apparatus 2 is described below with reference to FIG. 10. The controller 20 executes the print control process by the CPU 21 using RAM 23 to run the control program 25b stored on the hard disk drive 25.

The controller 20, in step S01, determines whether or not a print job was received from the terminal 1. If a print job was received from the terminal 1 (S01: Yes), the controller 20 goes to step S2. If a print job was not received from the terminal 1 (S01: No), the controller 20 repeats step S01.

The controller 20, in step S02, determines if the print job received from the terminal 1 is a specified-printer job having a printer 3 designated as the print destination, or is an unspecified-printer job not having printer 3 designated as the print destination. The controller 20 determines whether the print job received from the terminal 1 is a specified-printer job or an unspecified-printer job based on whether or not a printer identifier is added to the print job, for example. If the controller 20 determines print job received from the terminal 1 is a specified-printer job (S02: Yes), it goes to step S03. If the controller 20 determines print job received from the terminal 1 is an unspecified-printer job (S02: No), it goes to step S05.

The controller 20, in step S03, determines if the specified-printer job received from the terminal 1 is confidential. The controller 20 determines if the specified-printer job received from the terminal 1 is confidential based on whether or not the specified-printer job contains a specific string of characters at a specific location in the document of the specified-printer job, for example. That is, if the specific string of characters is found at the specific location in the document of the specified-printer job, the controller 20 determines the specified-printer job is confidential, and if the specific string of characters is not found at the specific location, determines the specified-printer job is not confidential.

The specific location in the document may be the header, footer, hidden characters, a watermark, or a digital watermark, for example. The specific character string may be a string such as SECRET, INTERNAL USE ONLY, TOP SECRET, DO NOT PRINT, or other text indicating the document is confidential. Note that the method of determining if a specified-printer job is confidential is not specifically limited to these methods. For example, is copy-evident printing is specified in the specified-printer job, the controller 20 determines the specified-printer job is confidential, and if copy-evident printing is not specified in the specified-printer job, the controller 20 determines the specified-printer job is not confidential.

The controller 20, goes to step S04 if in step S03 it determines the specified-printer job received from the terminal 1 is not confidential (S03: No).

In controller 20, in step S04, sends print data based on the specified-printer job received from the terminal 1 to the specified printer 3a. As a result, the specified-printer job is printed by the specified printer 3a.

If in step S03 the controller 20 determines that the specified-printer job received from the terminal 1 is confidential (S03: Yes), the controller 20 goes to step S05.

Figure 11:
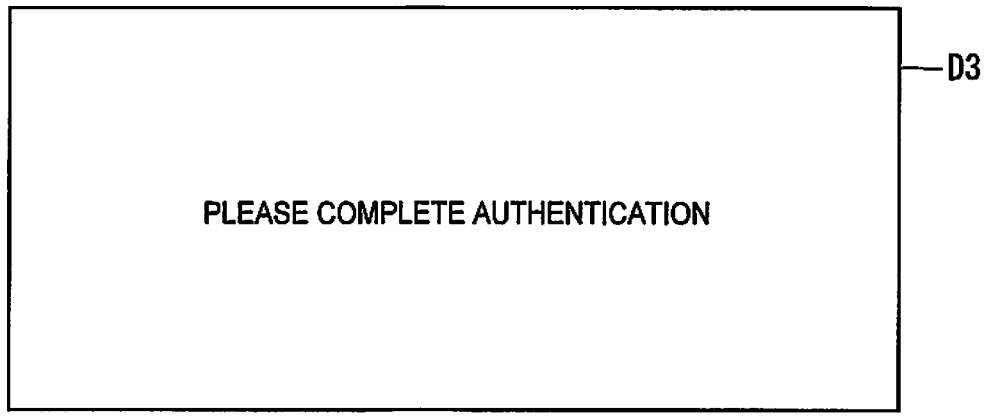
FIG. 11 shows an example of an authentication prompt.

In step S05, the controller 20 stores the print job received from the terminal 1 (unspecified-printer job and specified-printer job determined to be confidential) in the print job buffer 25c. At this time, the controller 20 may display on the terminal 1 that sent the specified-printer job an authentication prompt D3 prompting the user to execute the authentication operation for the printer 3 (see FIG. 11). As a result, when a specified-printer job is confidential, the user is prompted to execute the authentication operation for the printer 3.

In step S06, the controller 20 determines if authentication information was received from the printer 3. If authentication information was received from the printer 3 (S06: Yes), the controller 20 goes to step S07. If authentication information was not received from the printer 3 (S06: No), the controller 20 repeats step S06.

The controller 20, in step S07, then authenticates the user based on the authentication information received from the printer 3.

The controller 20, in step S08, determines if there is a print job (referred to below as a same-printer job) for which the same printer 3 as the authenticated printer 3b is specified as the print destination is included in the specified-printer jobs for which a print command was asserted by the same user as the user identified by the acquired authentication information included the print jobs stored in the print job buffer 25c. The controller 20 determines if there is a same-printer job based on whether or not there is a specified-printer job containing the same printer identifier as the printer identifier added to the received authentication information. If the controller 20 determines in step S08 that there is a same-printer job (S08: Yes), the printing control apparatus 2 goes to step S09.

The controller 20, in step S09, sends print data based on the same-printer jobs in the print jobs stored in the print job buffer 25c to the printer 3 that acquired the authentication information, that is, to the authenticated printer 3b. As a result, the same-printer jobs are printed by the authenticated printer 3b.

If the controller 20, in step S08, determines there are no same-printer jobs (S08: No), the controller 20 goes to step S10.

The controller 20, in step S10, then sends the print job list D2 to the authenticated printer 3b based on the print job list D2 transmission request received from the authenticated printer 3b.

The controller 20, in step S11, then determines whether or not a print data transmission request based on a print job corresponding to the job name 51 selected from the print job list D2 was received from the authenticated printer 3b. If the controller 20 determines a print data transmission request was received from the authenticated printer 3b (S11: Yes), the controller 20 goes to step S12. If the controller 20 determines a print data transmission request was not received from the authenticated printer 3b (S11: No), the controller 20 repeats step S11.

In step S12, based on the print data transmission request received from the authenticated printer 3b, the controller 20 sends to the authenticated printer 3b print data based on the print job corresponding to the job name 51 selected from the print job list D2 from among the print jobs stored in the print job buffer 25c. As a result, the print job corresponding to the job name 51 selected from the print job list D2 is printed by the authenticated printer 3b.

In this way, as described above, specified-printer jobs that are not confidential are printed by the specified printer 3a without being stored in the printing control apparatus 2. However, specified-printer jobs that are confidential are first stored in the printing control apparatus 2 before being printed by an authenticated printer 3b.

More specifically, same-printer jobs that are specified-printer jobs determined to be confidential, that is, that designate an authenticated printer 3b as the print destination, are printed by the authenticated printer 3b without a print job list D2 being displayed on the authenticated printer 3b. For example, when the user executes the authentication operation for the printer (A) after selecting printer (A) as the print destination of a specified-printer job that is confidential from the printer selection screen D1, same-printer jobs are printed by printer (A) without the print job list D2 being displayed on printer (A).

However, of the specified-printer jobs that are confidential, specified-printer jobs other than same-printer jobs, that is, specified-printer jobs for which a printer 3 other than the printer 3 that acquired the authentication information is designated as the print destination, are printed by the authenticated printer 3b by the user selecting the job name 51 of a specified-printer job from the print job list D2 displayed on the authenticated printer 3b. For example, if the user selects printer (A) as the print destination of a confidential specified-printer job from the printer selection screen D1, and then executes the authentication operation on printer (B), the print job list D2 is displayed on printer (B), and the specified-printer job is printed by printer (B) by the user selecting the job name 51 of the desired specified-printer job from the print job list D2.

An unspecified-printer job is first stored on the printing control apparatus 2, and is then printed by an authenticated printer 3b by the user selecting the job name 51 of the unspecified-printer job from the print job list D2 displayed on an authenticated printer 3b.

As described above, a printing control apparatus 2 according to this embodiment connects to terminals 1 and printers 3, and has a controller 20. The controller 20 determines if a specified-printer job received from a terminal 1 is confidential. If the specified-printer job is not confidential, the controller 20 sends print data based on the specified-printer job to the specified printer 3a. If the specified-printer job is confidential, the controller 20 stores the specified-printer job, and sends print data based on the stored specified-printer job to an authenticated printer 3b.

Thus comprised, if a specified-printer job is confidential, the specified-printer job is printed by an authenticated printer 3b. As a result, specified-printer jobs that are confidential are printed when the user is at the authenticated printer 3b. Therefore, information leaking because a print job is printed when the user is not at the printer 3 can be suppressed.

The controller 20 of the printing control apparatus 2 according to this embodiment also determines if the stored specified-printer jobs include a same-printer job. If is same-printer job is not found, and a specified-printer job is displayed as a printing candidate on an authenticated printer 3b, and the displayed specified-printer job is selected for printing, the controller 20 sends print data based on the specified-printer job to the authenticated printer 3b. If the controller 20 determines there is a same-printer job, the controller 20 sends print data based on the same-printer job to the authenticated printer 3b without displaying the specified-printer job as a printing candidate on the authenticated printer 3b.

In this configuration, when the authentication operation is executed on the same printer 3 as the specified printer 3a, the same-printer job is printed by the authenticated printer 3b without displaying the specified-printer job as a printing candidate on the authenticated printer 3b. As a result, the user can print the specified-printer job (more specifically, a same-printer job) on the authenticated printer 3b without needing to select the specified-printer job as a printing candidate by executing the authentication operation on the same printer 3 as the specified printer 3a.

Another example of a print control process executed by the printing control apparatus 2 is described next based on FIG. 12. This process is described by focusing on the differences with the print control process described above, and further description of the same content is abbreviated or omitted.

The controller 20, in step S21, determines if a print job was received from a terminal 1.

The controller 20, in step S22, determines if the print job received from the terminal 1 is a specified-printer job having a printer 3 designated as the print destination, or is an unspecified-printer job not having printer 3 designated as the print destination. If the controller 20 determines print job received from the terminal 1 is a specified-printer job (S22: Yes), it goes to step S23. If the controller 20 determines print job received from the terminal 1 is an unspecified-printer job (S22: No), it goes to step S30.

The controller 20, in step S23, determines if the specified-printer job received from the terminal 1 is confidential.

If the controller 20 determines in step S23 that the specified-printer job received from the terminal 1 is not confidential (S23: No), the controller 20 goes to step S24.

In controller 20, in step S24, sends print data based on the specified-printer job received from the terminal 1 to the specified printer 3a. As a result, the specified-printer job is printed by the specified printer 3a.

If in step S23 the controller 20 determines that the specified-printer job received from the terminal 1 is confidential (S23: Yes), the controller 20 goes to step S25.

The controller 20, in step S25, displays a printing process selection screen D4 on the terminal 1 that sent the specified-printer job.

Figure 13:
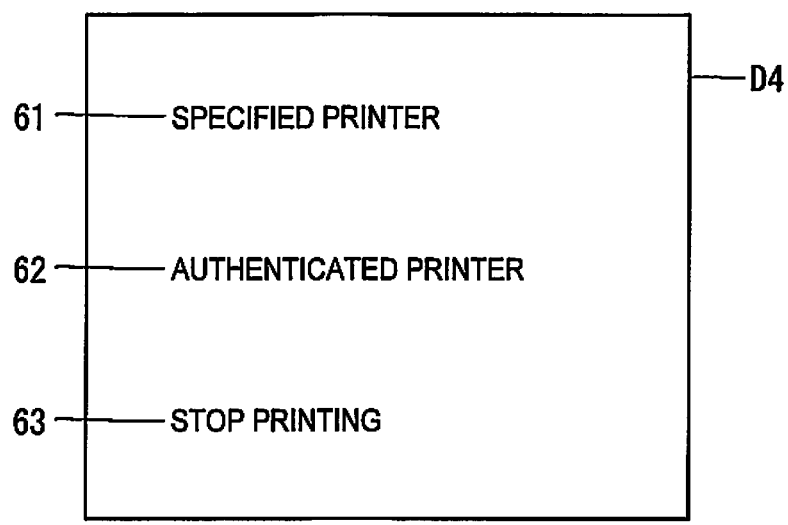
FIG. 13 shows an example of a printing process selection screen.

As shown in FIG. 13, the printing process selection screen D4 includes a first selection candidate 61 for printing a specified-printer job on a specified printer 3a, a second selection candidate 62 for printing a specified-printer job on an authenticated printer 3b, and a third selection candidate 63 for stopping printing a specified-printer job. Note that the controller 20 may display in the printing process selection screen D4 a message indicating that a specified-printer job received by the printing control apparatus 2 is confidential.

The controller 20 determines, in step S26, which selection candidate was selected from the printing process selection screen D4.

The controller 20 goes to step S27 if in step S26 it determines the first selection candidate 61 was selected from the printing process selection screen D4.

In step S27, the controller 20 queries the specified printer 3a for status information, and determines if the returned status information indicates a login state. If the returned status information does not indicate a login state (S27: No), the controller 20 goes to step S28.

The controller 20, in step S28, sends print data based on the specified-printer job to the specified printer 3a. As a result, the specified-printer job is printed by the specified printer 3a.

If in step S27 the controller 20 determines the status information indicates a login state (S27: Yes), the controller 20 returns to step S25 and displays the printing process selection screen D4 again. Note that in this event the controller 20 may cause the terminal 1 to display a message indicating that a user is logged in to the specified printer 3a.

The controller 20 goes to step S29 if in step S26 it determines the third selection candidate 63 was selected from the printing process selection screen D4. The controller 20, in step S29, executes a process to stop printing the specified-printer job.

The controller 20 goes to step S30 if in step S26 it determines the second selection candidate 62 was selected from the printing process selection screen D4.

The controller 20, in step S30, stores the print job received from the terminal 1 (unspecified-printer jobs and specified-printer jobs determined to be confidential) in the print job buffer 25c. Note that in this case the controller 20 may display an authentication prompt D3 on the terminal 1 that sent the specified-printer job.

The controller 20, in step S31, determines if authentication information was received from the printer 3.

The controller 20, in step S32, then authenticates the user based on the authentication information received from the printer 3.

The controller 20, in step S33, then sends the print job list D2 to the authenticated printer 3b.

The controller 20, in step S34, then determines whether or not a print data transmission request based on a print job corresponding to the job name 51 selected from the print job list D2 was received from the authenticated printer 3b.

In step S35, based on the print data transmission request received from the authenticated printer 3b, the controller 20 sends to the authenticated printer 3b print data based on the print job corresponding to the job name 51 selected from the print job list D2 from among the print jobs stored in the print job buffer 25c. As a result, the print job corresponding to the job name 51 selected from the print job list D2 is printed by the authenticated printer 3b.

As described above, when the controller 20 of the printing control apparatus 2 in this variation determines a specified-printer job is confidential, the controller 20 displays a printing process selection screen D4 on the terminal 1 that sent the specified-printer job. If the first selection candidate 61 is selected in the printing process selection screen D4, the controller 20 sends print data based on the specified-printer job to the specified printer 3a. If the second selection candidate 62 is selected in the printing process selection screen D4, the controller 20 sends print data based on the specified-printer job to the authenticated printer 3b.

When a specified-printer job is confidential, this configuration enables the user to select whether to print the specified-printer job on the specified printer 3a or an authenticated printer 3b. As a result, by selecting the first selection candidate 61 when a specified-printer job is confidential, the user can print the specified-printer job on the specified printer 3a without executing the authentication operation for the printer 3. In other words, if there is no one at the specified printer 3a, printed confidential information will not be leaked even if a confidential specified-printer job is printed on the specified printer 3a, and the user can therefore omit the need to execute the authentication operation by selecting the first selection candidate 61.

In addition, if the first selection candidate 61 is selected on the printing process selection screen D4, the controller 20 of the printing control apparatus 2 in this variation queries the specified printer 3a for status information, and if the status information indicates someone is already logged in, does not send print data based on the specified-printer job to the specified printer 3a.

This configuration suppresses the chance of printing a specified-printer job on a specified printer 3a to which someone is already logged in. As a result, if someone else is already logged in to the specified printer 3a, confidential information leaking to that person can be suppressed even if the user mistakenly selects the first selection candidate 61. Note that if the status information indicating that the user corresponding to the user information added to the specified-printer job is logged in, the controller 20 may send print data based on the specified-printer job to the specified printer 3a.

The invention is not limited to the foregoing embodiments, and can obviously be configured in various other ways without departing from the scope of the invention. Embodiments of the invention are not limited to the foregoing, and can be varied in many ways such as described below.

Figure 10:
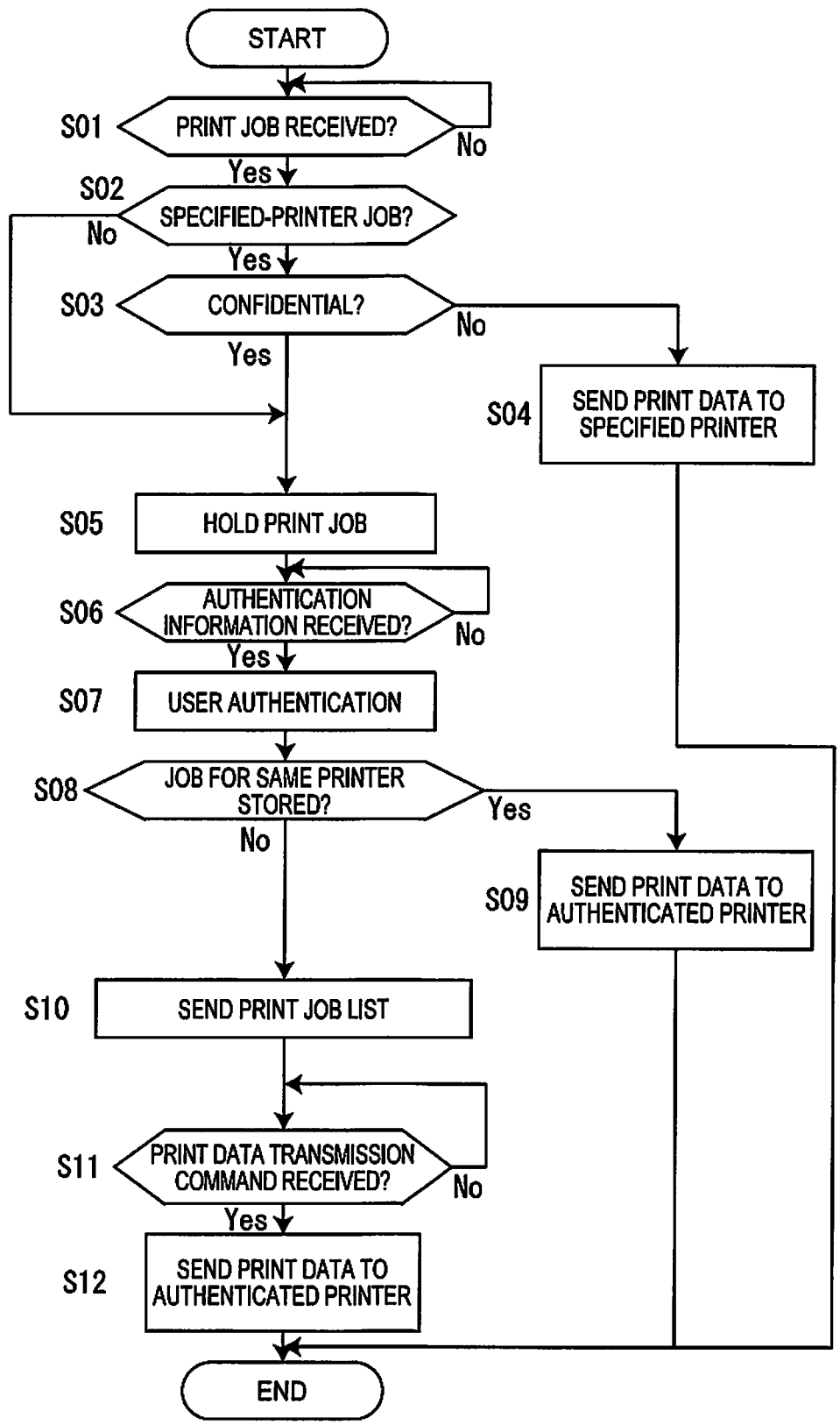
FIG. 10 is a flow chart of a print control process.
Figure 12:
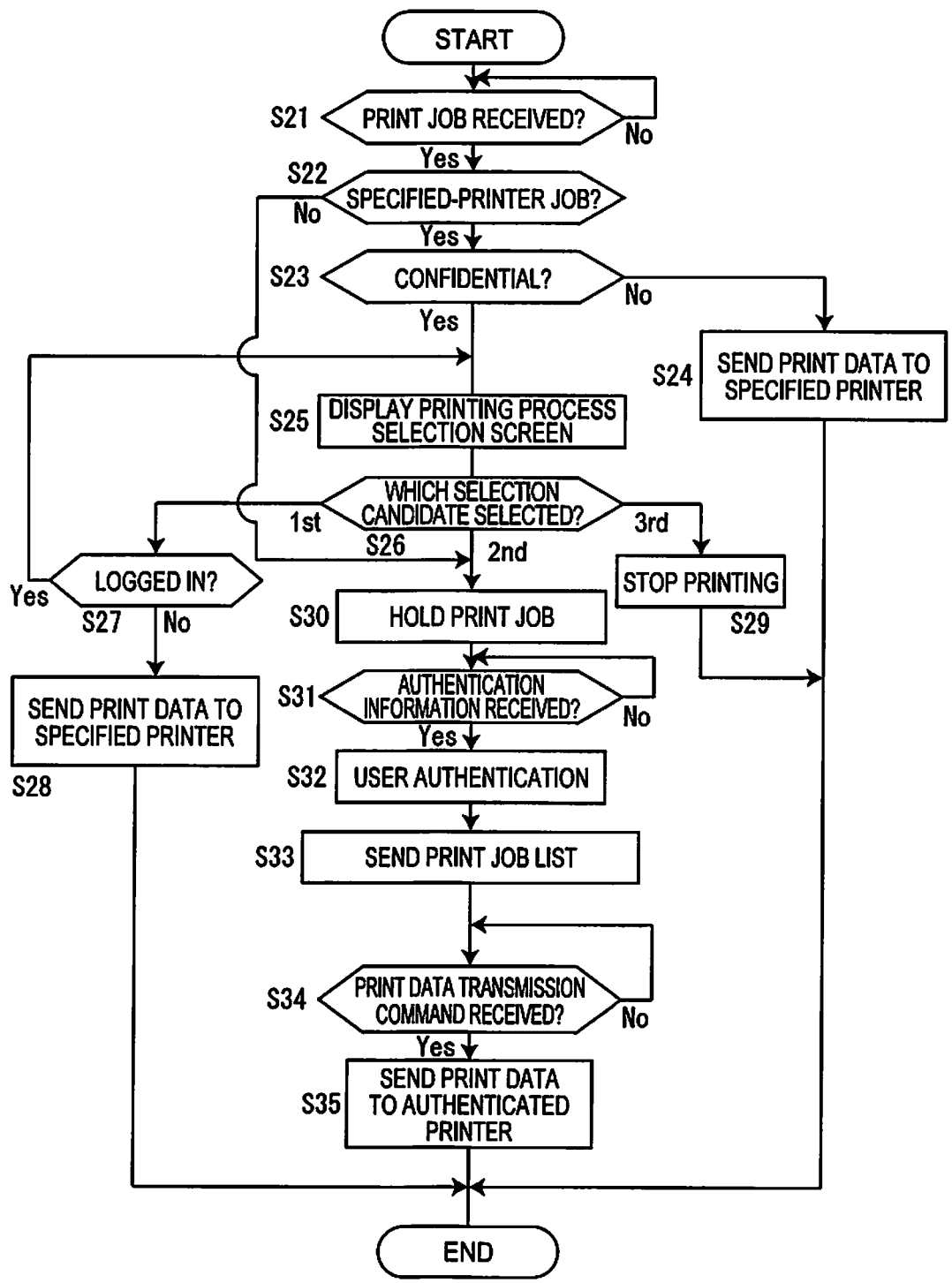
FIG. 12 is a flow chart of a variation of the print control process.

As in the print control process in the variation shown in FIG. 12, in the print control process shown in FIG. 10 the controller 20 may display a print job list D2 on the authenticated printer 3b after user authentication regardless of whether or not the stored print jobs include a same-printer job, and send to the authenticated printer 3b print data based on the print job corresponding to the job name 51 selected from the print job list D2. Conversely, as in the print control process shown in FIG. 10, in the print control process in the variation shown in FIG. 12 the controller 20 may also send print data based on a same-printer job to the authenticated printer 3b without displaying the print job list D2 on the authenticated printer 3b after user authentication if the stored print jobs include a same-printer job.

Furthermore, after user authentication, the controller 20 may send print data based on a specified-printer job to the authenticated printer 3b without displaying the print job list D2 on the authenticated printer 3b if the specified-printer job is included in the stored print jobs whether or not the specified-printer job is a same-printer job. In this configuration, print data based on a specified-printer job is sent to the authenticated printer 3b without the print job list D2 being displayed on the authenticated printer 3b even when the stored print jobs include a specified-printer job that is not a same-printer job.

When a specified-printer job that is received is confidential, the controller 20 sends print data based on the specified-printer job to an authenticated printer 3b, but the invention is not so limited. For example, when a specified-printer job that is received is confidential, the controller 20 may query the specified printer 3a for status information. If the status information does not indicate a logged-in status, the controller 20 sends print data based on the specified-printer job to the specified printer 3a, and if the status information indicates a logged-in status, the controller 20 does not send print data based on the specified-printer job to the specified printer 3a. This configuration suppresses printing when another user is logged in to the printer 3, and can suppress leaking of information resulting from a print job being printed when the user is not at the printer 3.

When a confidential specified-printer job is also a same-printer job, the controller 20 sends print data based on the specified-printer job to the authenticated printer 3b without displaying the print job list D2 on the authenticated printer 3b, but the invention is not so limited. For example, the controller 20 may store a received specified-printer job regardless of whether or not the received specified-printer job is confidential, and display on the authenticated printer 3b a print job list D2 of the stored specified-printer jobs that are not same-printer jobs (print jobs designating a printer 3 other than the printer 3 that acquired authentication information). For same-printer jobs, the controller 20 may also send print data based on a specified-printer job without displaying the print job list D2 on the authenticated printer 3b. By executing the authentication operation on the same printer 3 as the specified printer 3a, the user in this configuration can also print a specified-printer job on the authenticated printer 3b without needing to select the specified-printer job for printing.

The control program 25b is an example of a program in the accompanying claims. The program of the invention may also be provided stored on a computer-readable recording medium (such as CD-ROM or flash memory).

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2017-227579, filed Nov. 28, 2017 is expressly incorporated by reference herein.

What is claimed is:

1. A printing control apparatus that connects to a terminal and a printer, comprising:
a communicator configured to receive from the terminal a specified-printer job, which is a print job for which the printer is designated as a print destination; and
a controller configured to process the print job;
the controller determining whether or not the specified-printer job is confidential, and
if the specified-printer job is not confidential, sending print data based on the specified-printer job to a specified printer, which is the printer designated as the print destination in the specified-printer job, and
if the specified-printer job is confidential, receiving authentication information input to the printer from the printer and executing an authentication process based on the authentication information, and sending the print data to an authenticated printer, which is the printer that sent the authentication information, according to a result of the authentication process, wherein:
the controller determines whether or not the specified-printer job is a same-printer job designating the same printer as the authenticated printer as the print destination,
if the specified-printer job is not a same-printer job, displays the specified-printer job as a printing candidate on the authenticated printer, and if the displayed specified-printer job is selected for printing, sends the print data based on the specified-printer job to the authenticated printer, and
if the specified-printer job is a same-printer job, sends the print data based on the same-printer job to the authenticated printer without displaying the specified-printer job as a printing candidate on the authenticated printer.

2. The printing control apparatus described in claim 1, wherein:
the controller determines the specified-printer job is confidential when a specific string is included in a document of the specified-printer job, and determines the specified-printer job is not confidential when the specific string is not included in a document of the specified-printer job.

3. The printing control apparatus described in claim 1, wherein:
the controller, when the specified-printer job is confidential, displays on the terminal that sent the specified-printer job a printing process selection screen enabling selecting from among multiple selection candidates a first selection candidate causing printing the specified-printer job on the specified printer, and a second selection candidate causing printing the specified-printer job on the authenticated printer,
sending the print data based on the specified-printer job to the specified printer when the first selection candidate is selected from the printing process selection screen, and
sending the print data based on the specified-printer job to the authenticated printer when the second selection candidate is selected from the printing process selection screen.

4. The printing control apparatus described in claim 3, wherein:
the controller, when the first selection candidate is selected from the printing process selection screen, queries the specified printer for status information, and if the status information indicates a logged-in state, does not send the print data based on the specified-printer job to the specified printer.

5. The printing control apparatus described in claim 1, wherein:
the controller, when the specified-printer job is confidential, displays, on the terminal that sent the specified-printer job, an authentication prompt prompting the user to execute an authentication operation for the printer.

6. The printing control apparatus described in claim 1, wherein:
the specified-printer job contains user information; and
the controller, for the specified-printer job with user information corresponding to the input authentication information, sends the print data based on the specified-printer job to the authenticated printer.

7. A control method of a printing control apparatus that connects to a terminal and a printer, the control method causing the printing control apparatus to execute :

receiving from the terminal a specified-printer job, which is a print job for which the printer is designated as a print destination;

determining whether or not the specified-printer job is confidential;

if the specified-printer job is determined not confidential, sending print data based on the specified-printer job to a specified printer, which is the printer designated as the print destination in the specified-printer job; and if the specified-printer job is determined confidential, receiving authentication information input to the printer from the printer and executing an authentication process based on the authentication information, and sending the print data to an authenticated printer, which is the printer that sent the authentication information, according to a result of the authentication process, wherein the determining is performed by determining whether or not the specified-printer job is a same-printer job designating the same printer as the authenticated printer as the print destination, if the specified-printer job is not a same-printer iob, the specified-printer job is displayed as a printing candidate on the authenticated printer, and if the displayed specified-printer job is selected for printing, the print data based on the specified-printer job is sent to the authenticated printer, and if the specified-printer job is a same-printer job, the print data based on the same-printer job is sent to the authenticated printer without displaying of the specified-printer iob as a printing candidate on the authenticated printer.

8. A non-transitory computer-readable recording medium storing a program causing a processor of a printing control apparatus that connects to a terminal to execute :

receiving from the terminal a specified-printer job, which is a print job for which the printer is designated as a print destination;

determining whether or not the specified-printer job is confidential;

if the specified-printer job is determined not confidential, sending print data based on the specified-printer job to a specified printer, which is the printer designated as the print destination in the specified-printer job; and if the specified-printer job is determined confidential, receiving, from the printer., authentication information input to the printer from the printer and executing an authentication process based on the authentication information, and sending, the print data to an authenticated printer, which is the printer that sent the authentication information, according to a result of the authentication process, wherein the determining is performed by determining whether or not the specified-printer job is a same-printer job designating the same printer as the authenticated printer as the print destination, if the specified-printer job is not a same-printer job, the specified-printer job is displayed as a printing candidate on the authenticated printer, and if the displayed specified-printer job is selected for printing, the print data based on the specified-printer job is sent to the authenticated printer, and if the specified-printer job is a same-printer job, the print data based on the same-printer job is sent to the authenticated printer without displavinj of the specified-printer job as a printing candidate on the authenticated printer.

* * * * *